United States Patent
Zhou

(10) Patent No.: US 8,982,551 B2
(45) Date of Patent: Mar. 17, 2015

(54) ELECTRONIC DEVICE AND ELECTRONIC MODULE FIXING STRUCTURE THEREOF

(75) Inventor: Star-Wh Zhou, New Taipei (TW)

(73) Assignee: Wistron Corporation, New Taipei (TW)

( * ) Notice: Subject to any disclaimer, the term of this patent is extended or adjusted under 35 U.S.C. 154(b) by 161 days.

(21) Appl. No.: 13/615,670

(22) Filed: Sep. 14, 2012

(65) Prior Publication Data

US 2014/0043770 A1 Feb. 13, 2014

(30) Foreign Application Priority Data

Aug. 8, 2012 (CN) .......................... 2012 1 0280612

(51) Int. Cl.
*H05K 5/00* (2006.01)

(52) U.S. Cl.
USPC ............ 361/679.37; 361/679.35; 361/679.38; 361/679.39; 361/725; 361/726; 361/727; 361/737; 361/740; 361/825; 439/835; 439/836; 439/848

(58) Field of Classification Search
CPC ..... G06F 1/187; G06F 1/1658; G06F 1/1679; G06F 1/188; H05K 7/1411; H05K 5/0221
USPC .......... 361/679.35, 679.37, 679.39, 727, 825, 361/679.38, 725, 726, 754, 737, 740; 439/835, 836, 848
See application file for complete search history.

(56) References Cited

U.S. PATENT DOCUMENTS

| | | | | |
|---|---|---|---|---|
| 5,155,663 | A | * | 10/1992 | Harase ..................... 361/679.31 |
| 5,964,601 | A | * | 10/1999 | Tsurumaru et al. ........... 439/141 |
| 7,381,075 | B2 | * | 6/2008 | Gontarek et al. ............. 439/341 |
| 2005/0237708 | A1 | | 10/2005 | Chen |

FOREIGN PATENT DOCUMENTS

CN 101815417 8/2010

OTHER PUBLICATIONS

"Office Action of Taiwan Counterpart Application", issued on Sep. 17, 2014, p. 1-p. 28, with English translation thereof, in which the listed references were cited.

* cited by examiner

*Primary Examiner* — Hung S Bui
*Assistant Examiner* — James Wu
(74) *Attorney, Agent, or Firm* — Jianq Chyun IP Office

(57) ABSTRACT

An electronic device includes an electronic module and an electronic module fixing structure that includes a main body, a position-limiting component slideably disposed on the main body along a first direction, at least one positioning component slideably disposed on the main body along a second direction, and at least one first elastic component. The position-limiting component has a position-limiting portion. The first elastic component is connected between the main body and the positioning component. The position-limiting component resists an elastic force of the first elastic component to limit the positioning component to be at a first position. When the electronic module moves into the main body, the electronic module pushes the position-limiting component to drive the position-limiting portion to move away from the positioning component, and the positioning component moves to a second position by the elastic force of the first elastic component to position the electronic module.

28 Claims, 5 Drawing Sheets

ELECTRONIC DEVICE AND ELECTRONIC MODULE FIXING STRUCTURE THEREOF

CROSS-REFERENCE TO RELATED APPLICATION

This application claims the priority benefit of China application serial no. 201210280612.1, filed on Aug. 8, 2012. The entirety of the above-mentioned patent application is hereby incorporated by reference herein and made a part of this specification.

BACKGROUND OF THE INVENTION

1. Field of the Invention

The invention relates to an electronic device and a fixing structure thereof, and more particularly to an electronic device and an electronic module fixing structure thereof.

2. Description of Related Art

In the contemporary information era, dependence on electronic devices has been increasing. With the development of compact electronic devices, computer devices featuring compactness, such as notebook computers, tablet PCs, and all-in-one (AIO) PCs, have replaced the desktop computers and become more and more popular in the market of electronic devices.

Generally, the notebook computers, the tablet PCs, and the AIO PCs are all equipped with hard drive modules for storing data. Conventionally, when a user intends to disassemble the hard drive modules from the electronic devices, the user needs to remove screws applied for locking the hard drive modules, and the user then needs to assemble the hard drive modules back to the electronic devices through the screws. Hence, the maintenance or replacement of the hard drive modules is rather inconvenient. In view of the above, how to secure the hard drive modules with simple structural design and easily disassemble the hard drive modules from the electronic devices has become one of the important topics of designing the existing electronic devices.

SUMMARY OF THE INVENTION

The invention is directed to an electronic device in which an electronic module fixing structure may facilitate the disassembly and assembly of an electronic module.

The invention is further directed to an electronic module fixing structure which may facilitate the disassembly and assembly of an electronic module.

In an embodiment of the invention, an electronic device that includes an electronic module and an electronic module fixing structure is provided. The electronic module fixing structure includes a main body, a position-limiting component, at least one positioning component, and at least one first elastic component. The position-limiting component is slideably disposed on the main body along a first direction and has a position-limiting portion. The positioning component is slideably disposed on the main body along a second direction. The first elastic component is connected between the main body and the positioning component. The position-limiting component resists an elastic force of the first elastic component to limit the positioning component to be at a first position. When the electronic module moves into the main body, the electronic module pushes the position-limiting component to drive the position-limiting portion to move away from the positioning component, and the positioning component moves to a second position by the elastic force of the first elastic component to position the electronic module.

In an embodiment of the invention, an electronic module fixing structure adapted for an electronic device is provided, and the electronic device includes an electronic module. The electronic module fixing structure includes a main body, a position-limiting component, at least one positioning component, and at least one first elastic component. The position-limiting component is slideably disposed on the main body along a first direction and has a position-limiting portion. The positioning component is slideably disposed on the main body along a second direction. The first elastic component is connected between the main body and the positioning component. The position-limiting component resists an elastic force of the first elastic component to limit the positioning component to be at a first position. When the electronic module moves into the main body, the electronic module pushes the position-limiting component to drive the position-limiting portion to move away from the positioning component, and the positioning component moves to a second position by the elastic force of the first elastic component to position the electronic module.

According to an embodiment of the invention, the main body has an open slot, the position-limiting component has a bent portion, and the bent portion extends into the main body through the open slot. When the electronic module moves into the main body, the electronic module touches the bent portion to push the position-limiting component.

According to an embodiment of the invention, an extension direction of the open slot is parallel to the first direction.

According to an embodiment of the invention, the bent portion is connected to the position-limiting portion.

According to an embodiment of the invention, the position-limiting component has a neck, and a width of the neck in the second direction is smaller than a width of the position-limiting portion in the second direction. When the electronic module pushes the position-limiting component to drive the position-limiting portion to move away from the positioning component, the neck is aligned to the positioning component, and the positioning component is slid toward the neck through the elastic force of the first elastic component.

According to an embodiment of the invention, the electronic module fixing structure further includes a second elastic component connected between the main body and the position-limiting component. When the electronic module moves into the main body, the electronic module resists an elastic force of the second elastic component to push the position-limiting component and drive the position-limiting portion to move away from the positioning component.

According to an embodiment of the invention, the positioning component includes a sliding portion and a positioning portion. The sliding portion is slideably disposed on the main body along the second direction. The positioning portion is connected to the sliding portion and adapted for positioning or releasing the electronic module together with a sliding action of the sliding portion relative to the main body.

According to an embodiment of the invention, the first elastic component is connected between the sliding portion and the main body.

According to an embodiment of the invention, the positioning portion includes at least one positioning pillar, the electronic module has at least one positioning hole, and the positioning pillar is adapted for being inserted into the positioning hole along the second direction to position the electronic module.

According to an embodiment of the invention, the main body has at least one opening, and the positioning pillar is adapted for being extended into the main body through the opening.

According to an embodiment of the invention, the main body includes at least one protruding ear that has a sliding slot, and the positioning portion is slideably disposed on the sliding slot along the second direction.

According to an embodiment of the invention, the electronic module fixing structure further includes a releasing component slideably disposed on the position-limiting component. When the positioning component is located at the second position, the releasing component is adapted for sliding relative to the position-limiting component to push the positioning component to the first position, such that the positioning component moves away from the electronic module.

According to an embodiment of the invention, the positioning component has an extension portion that extends to the position-limiting component and limits the position-limiting component to be located on the main body, and the releasing component is adapted for pushing the extension portion to drive the positioning component to slide to the first position.

According to an embodiment of the invention, the releasing component is slideably disposed on the position-limiting component along the first direction and has a guiding inclined surface, and the releasing component is adapted for sliding along the first direction and pushing the positioning component through the guiding inclined surface to slide along the second direction.

According to an embodiment of the invention, the electronic module fixing structure further includes a third elastic component connected between the position-limiting component and the releasing component, and the releasing component is adapted for resisting an elastic force of the third elastic component to slide relative to the position-limiting component and push the positioning component.

In light of the foregoing, when a user moves the electronic module into the main body of the electronic module fixing structure described herein, the electronic module pushes the position-limiting component that is slideably disposed on the main body, such that the position-limiting component no longer limits the position of the positioning component, and that the positioning component slideably disposed on the main body is moved by the elastic force of the first elastic component to fix the electronic module in the main body. Thereby, the user may drive the positioning component to position the electronic module and completely assemble the electronic module merely by moving the electronic module into the main body. Since the electronic module is not fixed and locked by screws, the assembly of the electronic module is rather convenient and simple.

Several exemplary embodiments accompanied with figures are described in detail below to further explain the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EXEMPLARY EMBODIMENTS

Figure 1:
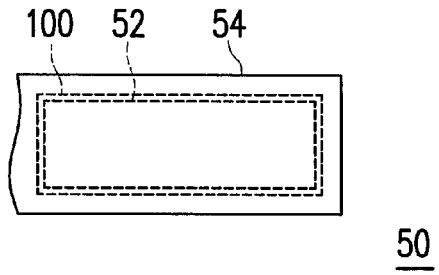
FIG. 1 is a schematic diagram illustrating an electronic device according to an embodiment of the invention.

FIG. 1 is a schematic diagram illustrating an electronic device according to an embodiment of the invention. With reference to FIG. 1, the electronic device 50 described in the present embodiment includes an electronic module 52 and an electronic module fixing structure 100. The electronic module fixing structure 100 is disposed within a casing 54 of the portable electronic device 50 and serves to fix the electronic module 52 into the casing 54. According to the present embodiment, the electronic device 50 is an AIO PC, for instance, and the electronic module 52 is a hard drive module in an AIO PC, for instance.

Figure 2:
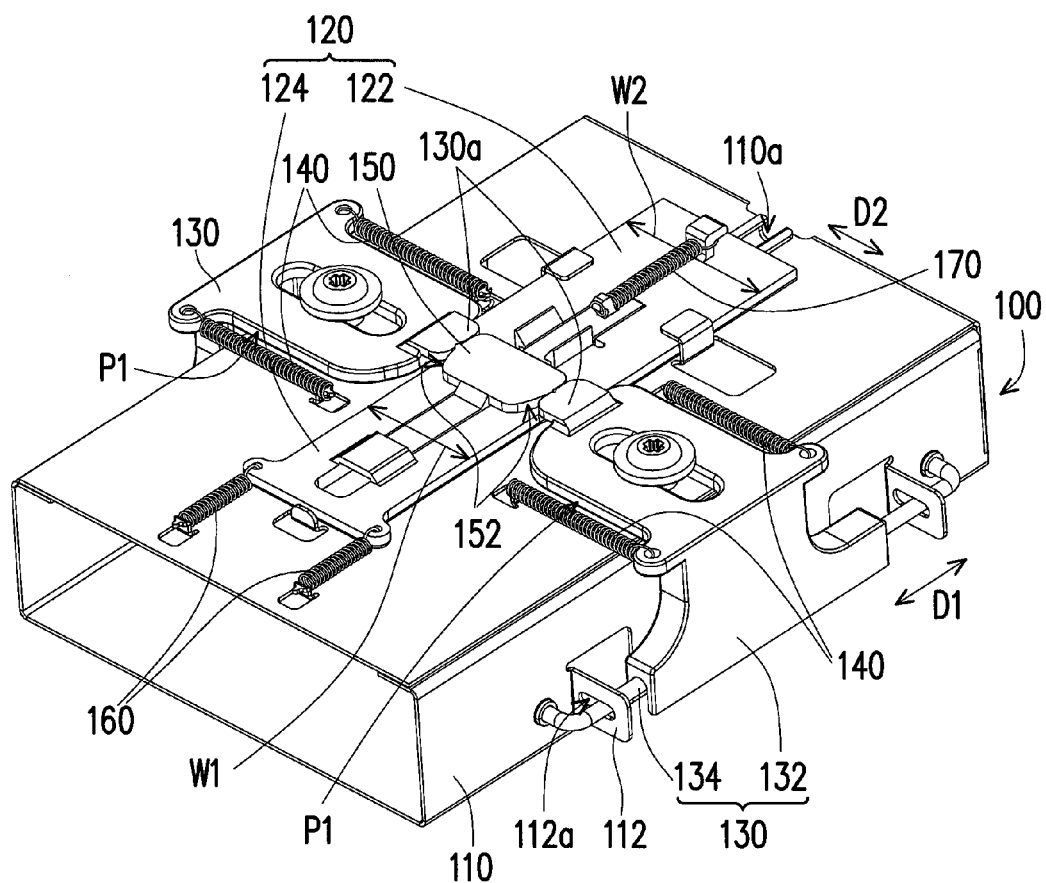
FIG. 2 is a three-dimensional diagram illustrating the electronic module fixing structure depicted in FIG. 1.

FIG. 2 is a three-dimensional diagram illustrating the electronic module fixing structure depicted in FIG. 1. With reference to FIG. 2, the electronic module fixing structure 100 described in the present embodiment includes a main body 110, a position-limiting component 120, at least one positioning component 130 (two of which are shown in FIG. 2), and at least one first elastic component 140 (several of which are shown in FIG. 2). The position-limiting component 120 is slideably disposed on the main body 110 along a first direction D1 and has a position-limiting portion 122. The positioning components 130 are slideably disposed on the main body 110 along a second direction D2, and the second direction D2 is perpendicular to the first direction D1, for instance. The first elastic components 140 are extension springs, for instance, and the first elastic components 140 are connected between the main body 110 and the positioning components 130. When the electronic module 52 is not installed in the electronic module fixing structure 100, the position-limiting portion 122 of the position-limiting component 120 resists the elastic force of the first elastic components 140 and limits the positioning components 130 to be at a first position P1, as shown in FIG. 2. At this time, the first elastic components 140 are in an extension state.

Figure 3A:
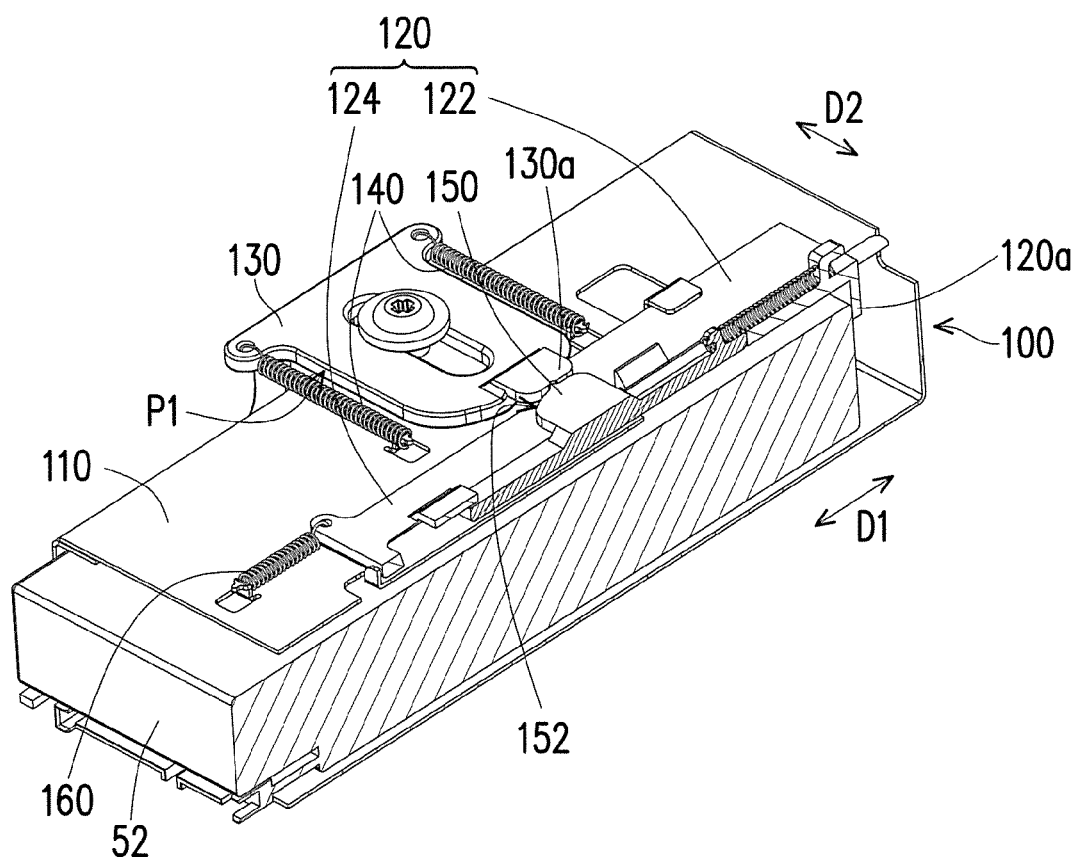
FIG. 3A and FIG. 3B are flowcharts illustrating an operation of the electronic module fixing structure depicted in FIG. 2.
Figure 3B:
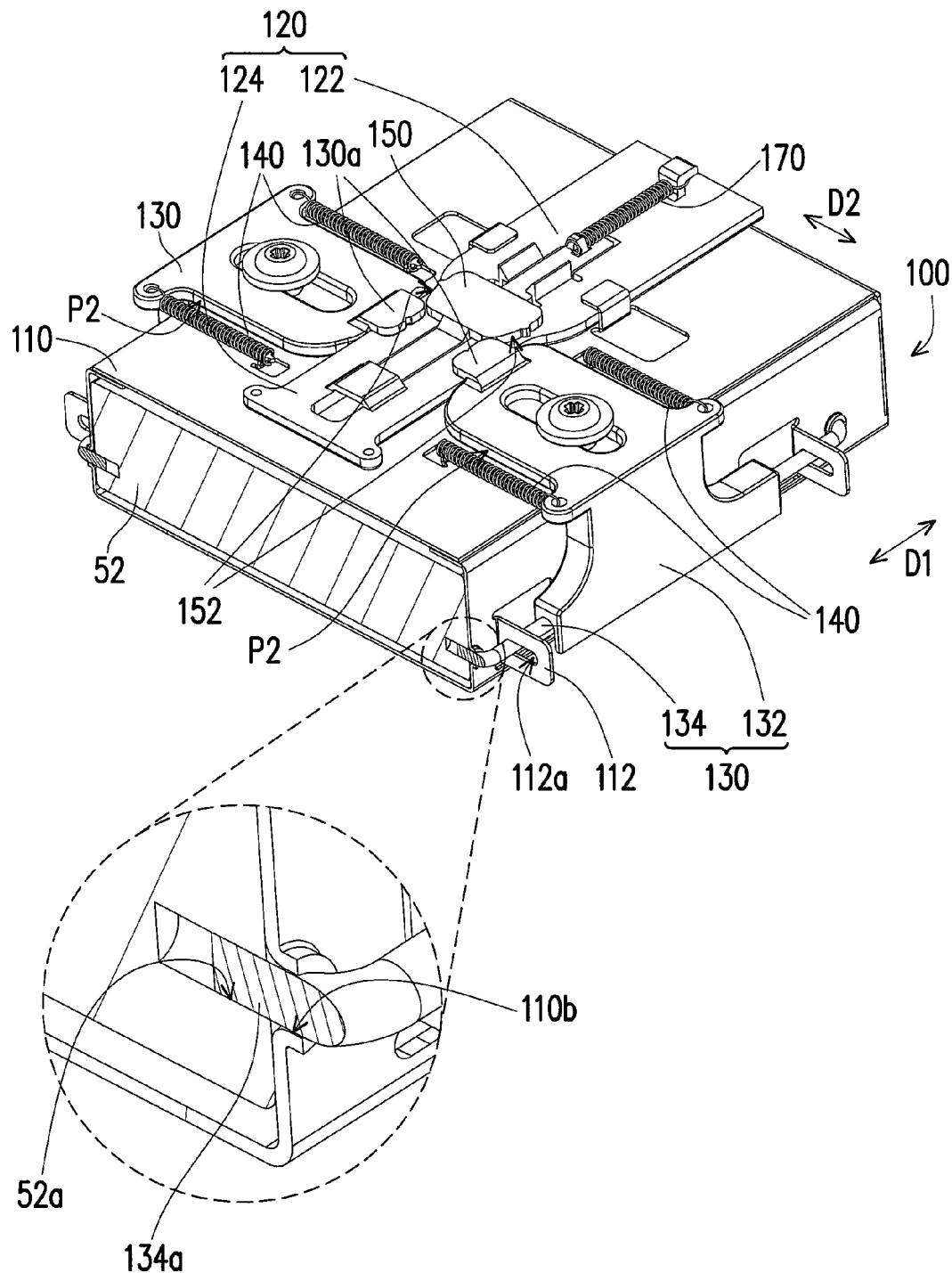
Figure 4:
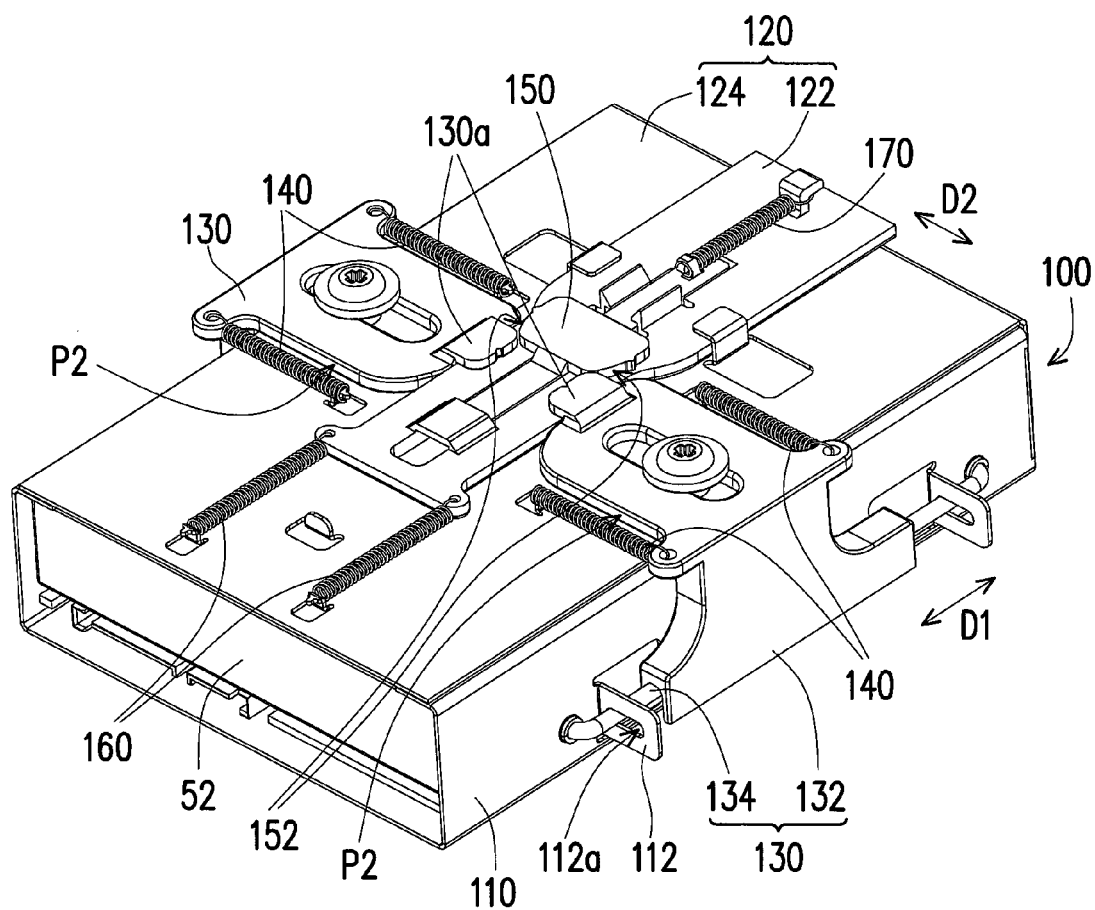
FIG. 4 is a three-dimensional diagram illustrating that the electronic module is positioned in the main body depicted in FIG. 2.

FIG. 3A and FIG. 3B are flowcharts illustrating an operation of the electronic module fixing structure depicted in FIG. 2. FIG. 4 is a three-dimensional diagram illustrating that the electronic module is positioned in the main body depicted in FIG. 2. To clearly illustrate the invention, FIG. 3A and FIG. 3B merely depict some structural components in the electronic module fixing structure 100 and in the electronic module 52. When a user moves the electronic module 52 into the main body 110, as shown in FIG. 3A, the electronic module 52 pushes the position-limiting component 120 to move from the position shown in FIG. 3A to the position shown in FIG. 3B, and thereby the position-limiting portion 122 moves away from the positioning components 130 as shown in FIG. 3B. At this time, the position of the positioning components 130 is no longer limited by the position-limiting portion 122; hence, the positioning components 130 move to the second position P2 shown in FIG. 3B from the first position P1 shown in FIG. 3A through the elastic force of the first elastic components 140. Thereby, the electronic module 52 is positioned in the main body 110 by the positioning components 130, as indicated in FIG. 3B and FIG. 4. As such, the user is merely required to move the electronic module 52 into the main body 110 and may then be able to drive the positioning components 130 to position the electronic module 52 and completely assemble the electronic module 52. Since the electronic module 52 need not be fixed and locked by screws, the assembly of the electronic module 52 is rather convenient and simple.

With reference to FIG. 2 and FIG. 3A, in the present embodiment, the main body 110 has an open slot 110a, the position-limiting component 120 has a bent portion 120a, and the bent portion 120a is connected to the position-limiting portion 122 and extends into the main body 110 through the open slot 110a. When the electronic module 52 moves into the main body 110, as shown in FIG. 3A, the electronic module 52 touches the bent portion 120a to push the position-limiting component 120. Besides, an extension direction of the open slot 110a is parallel to the sliding direction of the position-limiting component 120 (i.e., the first direction D1), such that the bent portion 120a may be able to move within the open slot 110a together with the sliding action of the position-limiting component 120.

With reference to FIG. 2, in the present embodiment, the position-limiting component 120 has a neck 124 that is connected to the position-limiting portion 122, and a width W1 of the neck 124 in the second direction D2 is smaller than a width W2 of the position-limiting portion 122 in the second direction D2. When the electronic module 52 pushes the position-limiting component 120 to drive the position-limiting portion 122 to move away from the positioning components 130 as shown in FIG. 3B, the neck 124 is aligned to the positioning components 130 together with the movement of the position-limiting component 120. Since the neck 124 has a relatively small width W2, two positioning components 130 are respectively slid toward the neck 124 through the elastic force of the two first elastic components 140 when the neck 124 is aligned to the positioning components 130, such that the positioning components 130 may move to the second position P2 from the first position P1.

In the present embodiment, each positioning component 130 includes a sliding portion 132 and a positioning portion 134. The sliding portion 132 is slideably disposed on the main body 110 along the second direction D2. The first elastic components 140 are connected between the main body 110 and the sliding portions 132. The positioning portion 134 is connected to the sliding portion 132 and adapted for positioning or releasing the electronic module 52 together with a sliding action of the sliding portion 132 relative to the main body 110. With reference to FIG. 3B, specifically, the positioning portion 134 includes at least one positioning pillar 134a, the electronic module 52 has at least one positioning hole 52a, and the main body 110 has at least one opening 110b. The positioning pillar 134a is adapted for being inserted into the positioning hole 52a along the second direction D2 through the opening 110b, so as to position the electronic module 52.

In the present embodiment, the main body 110 has at least one protruding ear 112 (several of which are shown in the drawing), and each protruding ear 112 has a sliding slot 112a. The positioning portions 134 of the positioning components 130 are slideably disposed on the sliding slots 112a along the second direction D2, such that the entire structure is more secure. When the positioning components 130 slide relative to the main body 110 along the second direction D2, the positioning portions 134 move within the sliding slots 112a together with the sliding action of the positioning components 130.

Figure 5:
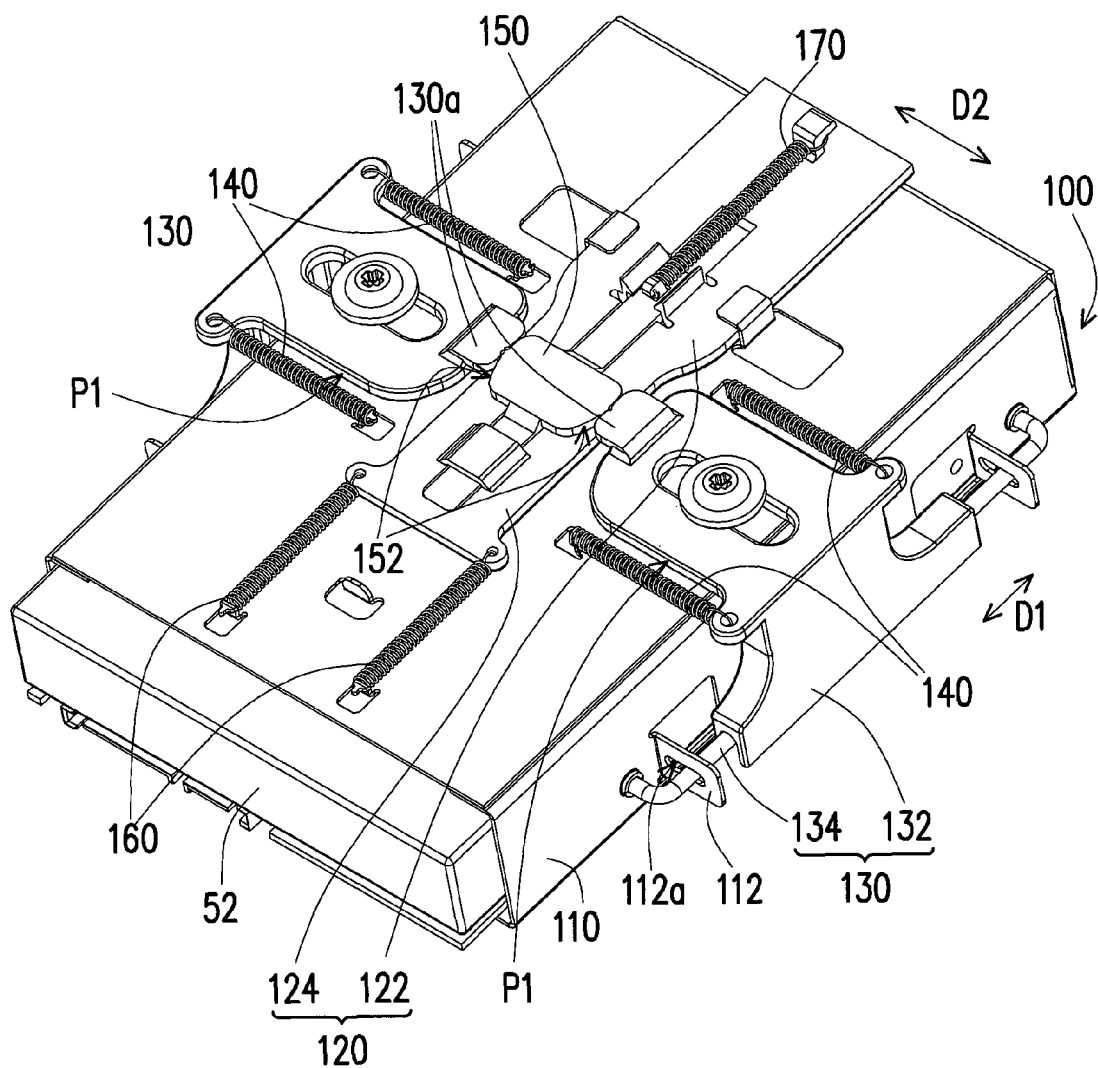
FIG. 5 is a three-dimensional diagram illustrating that the releasing component depicted in FIG. 4 pushes the positioning component.

With reference to FIG. 4, the electronic module fixing structure 100 described in the present embodiment further includes a releasing component 150 slideably disposed on the position-limiting component 120, and the releasing component is adapted for driving the positioning components 130 to release the electronic module 52. The operation of the releasing component 150 is explained hereinafter with reference to the drawings. FIG. 5 is a three-dimensional diagram illustrating that the releasing component depicted in FIG. 4 pushes the positioning component. When the positioning components 130 are located at the second position P2 and position the electronic module 52 as shown in FIG. 4, a user may push the releasing component 150 to slide relative to the position-limiting component 120 from the position shown in FIG. 4 to the position shown in FIG. 5, and thereby the positioning components 130 are pushed by the releasing component 150 from the second position P2 shown in FIG. 4 to the first position P1 shown in FIG. 5 and are moved away from the electronic module 52. At this time, the positioning portions 134 of the positioning components 130 move away from and release the electronic module 52, and the user is able to disassemble the electronic module 52 from the main body 110. Namely, the user is able to drive the positioning components 130 to release the electronic module 52 and complete the disassembly of the electronic module 52 merely by pushing the releasing component 150.

In the present embodiment, each positioning component 130 has an extension portion 130a that extends to the position-limiting component 120 and limits the position-limiting component 120 to be located on the main body 110. The releasing component 150 is adapted for pushing the extension portions 130a of the positioning components 130 to drive the positioning components 130 to slide to the first position P1, as shown in FIG. 5. According to the present embodiment, the releasing component 150 is slideably disposed on the position-limiting component 120 along the first direction D1 and has a guiding inclined surface 152, and the releasing component 150 is adapted for sliding along the first direction D1 and pushing the positioning component 130 through the guiding inclined surface 152 to slide along the second direction D2.

The electronic module fixing structure 110 described in the present embodiment further includes at least one second elastic component 160 (two of which are shown in FIG. 5), and the second elastic components 160 are, for instance, extension springs and connected between the main body 110 and the position-limiting component 120. When the electronic module 52 moves into the main body 110, as shown in FIG. 3A, the electronic module 52 resists the elastic force of the second elastic components 160 to push the position-limiting component 120 and drive the position-limiting portion 122 of the position-limiting component 120 to move away from the positioning components 130, as shown in FIG. 4. Thereby, the positioning components 130 is moved to the second position P2 by the elastic force of the first elastic components 140 and position the electronic module 52. At this time, the second elastic components 160 are in an extension state. When the releasing component 150 pushes the positioning components 130 away from the electronic module 52, as shown in FIG. 5, the electronic module 52 is no longer positioned by the positioning components 130, and thus the position-limiting component 120 is returned to the position shown in FIG. 3A by the elastic force of the second elastic components 160 and pushes the electronic module 52 out of the main body 110.

In the present embodiment, the electronic module fixing structure 110 further includes a third elastic component 170. Here, the third elastic component 170 is, for instance, an extension spring and connected between the position-limiting component 120 and the releasing component 150. When a user pushes the releasing component 150, the releasing component 150 resists an elastic force of the third elastic component 170 to slide relative to the position-limiting component 120, so as to push the positioning components 130 as shown in FIG. 5. At this time, the third elastic component 170 is in an extension state. When the user no longer exerts any force on the releasing component 150, the releasing component 150 is returned to the original position by the elastic force of the third elastic component 170.

To sum up, when a user moves the electronic module into the main body of the electronic module fixing structure described herein, the electronic module pushes the position-limiting component that is slideably disposed on the main body, such that the position-limiting component no longer limits the position of the positioning component, and that the positioning component slideably disposed on the main body is moved by the elastic force of the first elastic component to fix the electronic module in the main body. Thereby, the user may drive the positioning component to position the electronic module and completely assemble the electronic module merely by moving the electronic module into the main body. Since the electronic module is not fixed and locked by screws, the assembly of the electronic module is rather convenient and simple. Moreover, the user is able to drive the positioning component to release the electronic module and complete the disassembly of the electronic module merely by pushing the releasing component slideably disposed on the position-limiting component, which facilitates the disassembly of the electronic module.

It will be apparent to those skilled in the art that various modifications and variations can be made to the structure of the disclosed embodiments without departing from the scope or spirit of the invention. In view of the foregoing, it is intended that the invention covers modifications and variations of this invention provided they fall within the scope of the following claims and their equivalents.

What is claimed is:

1. An electronic device comprising:
    an electronic module; and
    an electronic module fixing structure comprising:
    a main body;
    a position-limiting component slidably disposed on the main body along a first direction, the position-limiting component having a position-limiting portion;
    at least one positioning component slidably disposed on the main body along a second direction;
    at least one first elastic component connected between the main body and the at least one positioning component, wherein the position-limiting component resists an elastic force of the at least one first elastic component to limit the at least one positioning component to be at a first position, and when the electronic module moves into the main body, the electronic module pushes the position-limiting component to drive the position-limiting portion to move away from the at least one positioning component, and the at least one positioning component slides along the second direction to a second position by the elastic force of the at least one first elastic component to contact and position the electronic module; and
    a releasing component slidably disposed on the position-limiting component, and when the at least one positioning component is located at the second position, the releasing component is adapted for sliding relative to the position-limiting component to push the at least one positioning component to the first position, such that the at least one positioning component moves away from the electronic module.

2. The electronic device as recited in claim 1, wherein the main body has an open slot, the position-limiting component has a bent portion, the bent portion extends into the main body through the open slot, and when the electronic module moves into the main body, the electronic module touches the bent portion to push the position-limiting component.

3. The electronic device as recited in claim 2, wherein an extension direction of the open slot is parallel to the first direction.

4. The electronic device as recited in claim 2, wherein the bent portion is connected to the position-limiting portion.

5. The electronic device as recited in claim 1, wherein the position-limiting component has a neck, a width of the neck in the second direction is smaller than a width of the position-limiting portion in the second direction, and when the electronic module pushes the position-limiting component to drive the position-limiting portion to move away from the at least one positioning component, the neck is aligned to the at least one positioning component, and the at least one positioning component is slid toward the neck through the elastic force of the at least one first elastic component.

6. The electronic device as recited in claim 1, wherein the electronic module fixing structure further comprises a second elastic component connected between the main body and the position-limiting component, and when the electronic module moves into the main body, the electronic module resists an elastic force of the second elastic component to push the position-limiting component and drive the position-limiting portion to move away from the at least one positioning component.

7. The electronic device as recited in claim 1, wherein the at least one positioning component comprises:
    a sliding portion slidably disposed on the main body along the second direction; and
    a positioning portion connected to the sliding portion and adapted for positioning or releasing the electronic module together with a sliding action of the sliding portion relative to the main body.

8. The electronic device as recited in claim 7, wherein the at least one first elastic component is connected between the sliding portion and the main body.

9. The electronic device as recited in claim 8, wherein the positioning portion comprises at least one positioning pillar, the electronic module has at least one positioning hole, and the at least one positioning pillar is adapted for being inserted into the at least one positioning hole along the second direction to position the electronic module.

10. The electronic device as recited in claim 9, wherein the main body has at least one opening, and the at least one positioning pillar is adapted for being extended into the main body through the at least one opening.

11. The electronic device as recited in claim 7, wherein the main body comprises at least one protruding ear having a sliding slot, and the positioning portion is slidably disposed on the sliding slot along the second direction.

12. The electronic device as recited in claim 1, wherein the at least one positioning component has an extension portion extending to the position-limiting component and limiting the position-limiting component to be located on the main body, and the releasing component is adapted for pushing the extension portion to drive the at least one positioning component to slide to the first position.

13. The electronic device as recited in claim 1, wherein the releasing component is slidably disposed on the position-limiting component along the first direction and has a guiding inclined surface, and the releasing component is adapted for sliding along the first direction and pushing the at least one positioning component through the guiding inclined surface to slide along the second direction.

14. The electronic device as recited in claim 1, wherein the electronic module fixing structure further comprises a third elastic component connected between the position-limiting component and the releasing component, and the releasing component is adapted for resisting an elastic force of the third elastic component to slide relative to the position-limiting component and push the at least one positioning component.

15. An electronic module fixing structure adapted for an electronic device, the electronic device comprising an electronic module, the electronic module fixing structure comprising:
 a main body;
 a position-limiting component slidably disposed on the main body along a first direction, the position-limiting component having a position-limiting portion;
 at least one positioning component slidably disposed on the main body along a second direction;
 at least one first elastic component connected between the main body and the at least one positioning component, wherein the position-limiting component resists an elastic force of the at least one first elastic component to limit the at least one positioning component to be at a first position, and when the electronic module moves into the main body, the electronic module pushes the position-limiting component to drive the position-limiting portion to move away from the at least one positioning component, and the at least one positioning component slides along the second direction to a second position by the elastic force of the at least one first elastic component to contact and position the electronic module; and
 a releasing component slidably disposed on the position-limiting component, and when the at least one positioning component is located at the second position, the releasing component is adapted for sliding relative to the position-limiting component to push the at least one positioning component to the first position, such that the at least one positioning component moves away from the electronic module.

16. The electronic module fixing structure as recited in claim 15, wherein the main body has an open slot, the position-limiting component has a bent portion, the bent portion extends into the main body through the open slot, and when the electronic module moves into the main body, the electronic module touches the bent portion to push the position-limiting component.

17. The electronic module fixing structure as recited in claim 16, wherein an extension direction of the open slot is parallel to the first direction.

18. The electronic module fixing structure as recited in claim 16, wherein the bent portion is connected to the position-limiting portion.

19. The electronic module fixing structure as recited in claim 15, wherein the position-limiting component has a neck, a width of the neck in the second direction is smaller than a width of the position-limiting portion in the second direction, and when the electronic module pushes the position-limiting component to drive the position-limiting portion to move away from the at least one positioning component, the neck is aligned to the at least one positioning component, and the at least one positioning component is slid toward the neck through the elastic force of the at least one first elastic component.

20. The electronic module fixing structure as recited in claim 15, further comprising a second elastic component connected between the main body and the position-limiting component, wherein when the electronic module moves into the main body, the electronic module resists an elastic force of the second elastic component to push the position-limiting component and drive the position-limiting portion to move away from the at least one positioning component.

21. The electronic module fixing structure as recited in claim 15, wherein the at least one positioning component comprises:
 a sliding portion slidably disposed on the main body along the second direction; and
 a positioning portion connected to the sliding portion and adapted for positioning or releasing the electronic module together with a sliding action of the sliding portion relative to the main body.

22. The electronic module fixing structure as recited in claim 21, wherein the at least one first elastic component is connected between the sliding portion and the main body.

23. The electronic module fixing structure as recited in claim 22, wherein the positioning portion comprises at least one positioning pillar, the electronic module has at least one positioning hole, and the at least one positioning pillar is adapted for being inserted into the at least one positioning hole along the second direction to position the electronic module.

24. The electronic module fixing structure as recited in claim 23, wherein the main body has at least one opening, and the at least one positioning pillar is adapted for being extended into the main body through the at least one opening.

25. The electronic module fixing structure as recited in claim 21, wherein the main body comprises at least one protruding ear having a sliding slot, and the positioning portion is slidably disposed on the sliding slot along the second direction.

26. The electronic module fixing structure as recited in claim 15, wherein the at least one positioning component has an extension portion extending to the position-limiting component and limiting the position-limiting component to be located on the main body, and the releasing component is adapted for pushing the extension portion to drive the at least one positioning component to slide to the first position.

27. The electronic module fixing structure as recited in claim 15, wherein the releasing component is slidably disposed on the position-limiting component along the first direction and has a guiding inclined surface, and the releasing component is adapted for sliding along the first direction and pushing the at least one positioning component through the guiding inclined surface to slide along the second direction.

28. The electronic module fixing structure as recited in claim 15, further comprising a third elastic component connected between the position-limiting component and the releasing component, wherein the releasing component is adapted for resisting an elastic force of the third elastic component to slide relative to the position-limiting component and push the at least one positioning component.

* * * * *